United States Patent
Mason et al.

(10) Patent No.: US 6,323,291 B1
(45) Date of Patent: Nov. 27, 2001

(54) COMPOSITIONS HAVING LOW BIREFRINGENCE

(75) Inventors: James P. Mason, McKees Rocks; Jon M. Newcome, Aliquippa, both of PA (US); Jeff M. Tennant, New Cumberland, WV (US)

(73) Assignee: Bayer Corporation, Pittsburgh, PA (US)

( * ) Notice: Subject to any disclaimer, the term of this patent is extended or adjusted under 35 U.S.C. 154(b) by 1140 days.

(21) Appl. No.: 08/640,300

(22) Filed: Apr. 30, 1996

Related U.S. Application Data

(63) Continuation-in-part of application No. 08/419,785, filed on Apr. 11, 1995, now abandoned.

(51) Int. Cl.$^7$ .............................. C08L 69/00; C08L 67/02
(52) U.S. Cl. ............................................................ 525/439
(58) Field of Search ................................................ 525/439

(56) References Cited

U.S. PATENT DOCUMENTS

| | | | | |
|---|---|---|---|---|
| 4,495,345 | * | 1/1985 | Kawakami | 528/372 |
| 4,764,331 | * | 8/1988 | Tokuhara | 264/106 |
| 4,786,692 | | 11/1988 | Allen et al. | 525/439 |
| 5,115,041 | * | 5/1992 | Tenney | 525/339 |
| 5,424,389 | * | 6/1995 | Friedl | 528/201 |
| 5,461,120 | * | 10/1995 | Mason | 525/439 |

FOREIGN PATENT DOCUMENTS

| | | |
|---|---|---|
| 714933 | 6/1996 | (EP) . |
| 714935 | 6/1996 | (EP) . |
| 717071 | 6/1996 | (EP) . |

* cited by examiner

*Primary Examiner*—David J. Buttner
(74) *Attorney, Agent, or Firm*—Joseph C. Gil; Aron Preis

(57) ABSTRACT

A thermoplastic molding composition suitable for the preparation of articles having low birefringence is disclosed. Accordingly, the composition contains polycarbonate and a polyester copolymer based on cyclohexane-dimethanol, ethylene glycol and phthalic acid. The invention resides in the findings that the incorporation of a polycarbonate resin having a melt flow index greater than 18 g/10 minutes impart to the composition low birefringence values. The composition is suitable for the preparation of optical storage media, including compact discs.

26 Claims, No Drawings

COMPOSITIONS HAVING LOW BIREFRINGENCE

This application is a Continuation-In-Part of application Ser. No. 08/419,785 filed Apr. 11, 1995 now abandoned.

FIELD OF THE INVENTION

The invention is directed to a thermoplastic molding composition and more particularly to a composition containing polycarbonate and a copolyester of cyclohexane dimethanol.

SUMMARY OF THE INVENTION

A thermoplastic molding composition suitable for the preparation of articles having low birefringence is disclosed. Accordingly, the composition contains polycarbonate and a polyester copolymer based on cyclohexane-dimethanol, ethylene glycol and phthalic acid. The invention resides in the findings that the incorporation of a polycarbonate resin having a melt flow index greater than 18g/10 minutes impart to the composition low birefringence values. The composition is suitable for the preparation of optical storage media, including compact discs.

BACKGROUND OF THE INVENTION

Thermoplastic compositions containing polycarbonate and polyester resins are known. Thermoplastic molding compositions containing a mixture of polycarbonate and a polyester copolymer derived from cyclohexane dimethanol and phthalic acid are also known and such compositions have been disclosed in U.S. Pat. No. 4,786,692. Characterized by their low heat distortion temperatures, high tensile and flexural strength, the compositions are said to be compatible with impact modifiers and flame retardants.

Polycarbonate resins and compositions based thereon have been extensively used in the preparation of optical storage media, such as compact discs. A critical parameter relative to such media and the molding materials therefor is their low birefringence.

DETAILED DESCRIPTION OF THE INVENTION

The composition of the invention contains
(i) about 60 to 99, preferably 70 to 90 percent by weight of a polycarbonate resin having a high melt flow index, and
(ii) about 1 to 40, preferably 10 to 30 percent by weight of a polyester copolymer of phthalic acid and cyclohexanedimethanol (CHDM)-/ethylene glycol (EG).

The invention resides in the finding that compositions of the invention are characterized by their low birefringence, a characteristic which makes these compositions suitable in the manufacture of compact discs. The suitability for such disc manufacture has been determined by first extruding the composition and then forming a disc having a diameter of about 120 mm, by injection molding. The optical path difference at a disc radius of 30 mm to 60 mm was then measured using a birefringence meter with a 780 nm red laser. The discs made of the inventive compositions have lower optical path difference and therefore lower birefringence values than corresponding discs made of polycarbonate resin alone.

Aromatic polycarbonates suitable in the context of the present invention are homopolycarbonates and copolycarbonates and mixtures thereof. These polycarbonates generally have a weight average molecular weight of about 16,000 to 21,000, most preferably 18,000 to 19,000 and their high melt flow index (determined in accordance with the procedure of ASTM D-1238 at 300° C./under 1.2 kg load) is at least about 18, preferably 50 to 80, most preferably 65 to 75 g/10 minutes. These resins are known and are readily available in commerce. Suitable polycarbonate resins are prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Pat. No. 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

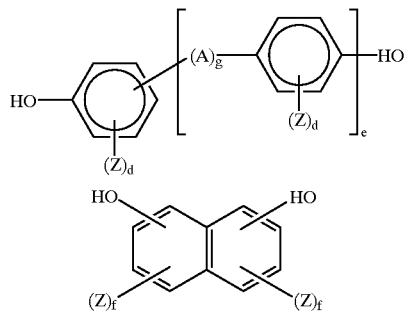

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

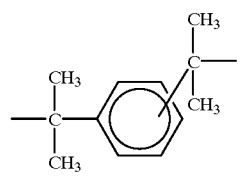

e and g both denote the number 0 to 1; Z denotes F, Cl, Br or C$_1$–C$_4$-alkyl and if several Z radicals are substituents in one aryl radical, they may be identical or different from one another; d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)diisopropylbenzenes, as well as their nuclear-alkylated compounds. These and further suitable aromatic dihydroxy compounds are described, for example, in U.S. Pat. Nos. 3,028,356; 4,982,014; 5,010,162; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 3,3,5-trimethyl-1,1- bis(4-hydroxyphenyl)-cyclohexane, 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl4-hydroxyphenyl)-propane, 2,2-bis-(3-chloro-4-hydroxyphenyl)propane, bis-(3,5-dimethyl4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 3,3,5-trimethyl-1,1-bis(4-hydroxyphenyl)-cyclohexane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonates, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexylpropane; 2,4-bis-(4-hydroxy-1-isopropylidene-)-phenol; 2,6bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, under the trademark Makrolon from Bayer Corporation of Pittsburgh, Pa. and from Bayer AG of Leverkusen, Germany.

Polycarbonate resins suitable in the practice of the invention are known and their structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The polyester copolymer of the invention comprises the reaction product of a glycol portion which contains 1,4-cyclohexanedimethanol (CHDM) and ethylene glycol (EG) wherein the molar ratio of CHDM to EG is from about 1:1 to 4:1, preferably the glycol portion has a predominance of CHDM over EG, with an acid portion comprising mostly phthalic acid.

The polyester copolymer component may be prepared by procedures well known to those skilled in this art, such as by condensation reactions substantially as shown and described in U.S. Pat. No. 2,901,466. More particularly, the acid or mixture of acids or alkyl esters of the aromatic dicarboxylic acid or acids, for example dimethylterephthalate, together with the dihydric alcohols are charged to a flask and heated to temperatures sufficient to cause condensation of the copolymer to begin, for example to 175° to 225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually herein. Generally, however, when an alkyl ester of the dicarboxylic acid compound is employed, an ester interchange type of catalyst is preferred, such as $NaHTi(OC_4H_9)_6$ in n-butanol. If a free acid is being reacted with the free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly monomeric condensation product produced can be cooled, pulverized, and the powder heated to a temperature somewhat less than that employed during the last stage of the molten phase polymerization, thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under a greatly reduced pressure.

The copolyesters for use in the subject invention generally will have an internal viscosity of at least about 0.4 dl./g as measured in 60/40 phenoltetrachloroethane or other similar solvent at about 25° C. The relative amounts of the 1,4-cyclohexanedimethanol to ethylene glycol in the glycol portion may vary so long as the molar ratio of 1,4- cyclohexanedimethanol to ethylene glycol is from 1:1 to 4:1; preferably there will be a molar predominance of CHDM over EG.

A preferred copolymer for use in the subject invention is a copolyester as described above wherein the glycol portion contains about 65 mole percent of 1,4-cyclohexanedimethanol and about 35 mole percent of ethylene glycol and the acid portion is terephthalic acid. When the preferred copolyester is blended with bisphenol-A polycarbonate, the resultant blends are generally completely miscible over a broad range of the components, exhibit a single glass transition temperature indicating the formation of a single phase blend and exhibit transparency of greater than 80%. These blends show significant reduction in heat distortion temperature over polycarbonate and in addition retain very high flexural and tensile strength. A commercially available copolyester of the preferred type is Ektar DN001 PCTG sold by the Eastman Kodak Company. This resin is characterized in that it has an inherent viscosity of about 0.72 to 0.8 and a molar ratio of CHDM to EG of about 4:1.

The composition of the invention may contain impact modifiers, stabilizers, flame retarding agents, reinforcing agents, fillers and pigments and the like all of which are known in the art for their utility in polycarbonate/polyester blends.

The composition of the invention is prepared by methods and procedures which are well known in the art.

The invention is further illustrated but is not to be limited by the following examples in which all parts and percentages are by weight unless otherwise specified.

EXAMPLES

Compositions in accordance with the invention were prepared and their properties determined. In preparing the compositions which are described below, the polycarbonate resin was Bayer's Makrolon CD 2000 homopolycarbonate resin based on bisphenol-A. This resin has a melt flow index of about 70 g/10 min. per ASTM D-1238 (PC1) and Makrolon FCR2400 resin, a corresponding homopolycarbonate having a melt flow index (MFI) of about 20 g/10 min (PC2). The polyester copolymer was Eastman's Ektar DN001, a phthalate having a CHDM:EG ratio of about 4:1 and inherent viscosity of 0.72 to 0.8 (referred to in the table as POLYESTER). The compositions representative of the invention contained 0.2 pph (parts per hundred resin) of a phosphite stabilizer having no material effect in the context of the invention.

The compositions were first extruded in a twin screw extruder and compact discs having a diameter of about 120 mm were injection-molded. The optical path difference at a disc radius of 30 mm to 60 mm was measured using a birefringence meter with a 780 nm red laser. The results, tabulated below, show that the discs made of compositions representative of the invention have lower optical path difference and therefore lower birefringence than corresponding discs made of polycarbonate resin alone. In the table, the compositions are described in terms of their resinous components (in percent by weight) and melt indices.

TABLE 1

| Example | 1 | 2 | 3 | 4 |
|---|---|---|---|---|
| PC1, % | 100 | 85 | 70 | 0 |
| PC2, % | 0 | 0 | 0 | 70 |
| POLYESTER, % | 0 | 15 | 30 | 30 |
| MFI at 300° C., g/10 min. | 72 | 90 | 73 | 36 |
| Optical path Difference (nm) | | | | |
| @ 30 mm | 23–24 | 15–16 | 2–4 | 5 |
| @ 34 mm | 19–20 | 11 | 3 | 3 |
| @ 40 mm | 14–15 | 5–6 | 2–3 | 1 |
| @ 45 mm | 14 | 2–3 | 1–2 | 0 |
| @ 50 mm | 14 | 2–3 | 1 | 2 |
| @ 55 mm | 14 | 2–3 | 0–2 | 0 |
| @ 60 mm | 19–20 | 12–13 | 11–17 | 13 |

In an additional series of experiments, compositions were prepared and tested as described below and presented in Table 2 below. The compositions contained 0.1 pph of a phosphite stabilizer having no material effect in the context of the invention. The polycarbonate resins used in these experiments were PC1 and Makrolon 2600 homopolycarbonate based on bisphenol-A having a melt flow index of about 11(PC3). The preparation of the compositions, the test specimens and the test procedures were substantially identical to the ones noted above.

TABLE 2

| Example | 5 | 6 | 7 | 8 |
|---|---|---|---|---|
| PC1, % | 98 | 95 | 0 | 100 |
| PC3, % | 0 | 0 | 70 | 0 |
| POLYESTER, % | 2 | 5 | 30 | 0 |
| MFI at 300° C., g/10 min. | 70 | 71 | 21 | 70 |
| Optical path Difference (nm) | | | | |
| @ 25 mm | 15.8 | 17.6 | 84 | 22.4 |
| @ 30 mm | 10.2 | 11.4 | 77.4 | 16.6 |
| @ 35 mm | 6 | 6.8 | 70.2 | 12.6 |
| @ 40 mm | 2.8 | 5 | 63.4 | 12 |
| @ 45 mm | −1.2 | 2.6 | 59.6 | 11.6 |
| @ 50 mm | −7.2 | −2.4 | 52 | 10.6 |
| @ 55 mm | −11.4 | −3.8 | 65.4 | 8.4 |

The data in Table 2 demonstrate the efficacy of relatively small amounts of the copolyester of the invention to bring about a marked reduction in the birefringence values of the inventive composition.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (i) about 60 to 99 percent by weight of a polycarbonate resin, and
   (ii) about 1 to 40 percent by weight of a copolyester of phthalic acid and a mixture of cyclohexanedimethanol and ethylene glycol,
       said cyclohexane dimethanol and said ethylene glycol being present in said polyester copolymer in a molar ratio of 1:1 to 4:1 therebetween,
said polycarbonate having a melt flow index of at least 18.0 g/10 minutes as determined in accordance with ASTM D-1238 at 300° C./under 1.2 kg load, said percent in both occurrences being relative to the total weight of said (i) and (ii).

2. The composition of claim 1 wherein said polycarbonate is present in an amount of 70 to 90 percent.

3. The composition of claim 1 wherein said copolyester is present in an amount of 10 to 30 percent.

4. The composition of claim 1 wherein said index is about 50 to 80 g/10 min.

5. The composition of claim 1 wherein said index is about 65 to 75 g/10 min.

6. The composition of claim 1 wherein said (i) is a homopolycarbonate derived from bisphenol-A.

7. The composition of claim 4 wherein said (i) is a homopolycarbonate derived from bisphenol-A.

8. A thermoplastic molding composition having melt flow index of at least 30 g/10 minutes, comprising (i) about 60 to 99 percent by weight of a polycarbonate resin, and (ii) about 1 to 40 percent by weight of a copolyester of phthalic acid and a mixture of cyclohexanedimethanol and ethylene glycol, said cyclohexane dimethanol and said ethylene glycol being present in said polyester copolymer in a molar ratio of 1:1 to 4:1 therebetween, said polycarbonate having a melt flow index of at least 18.0 g/10 minutes; said index, both occurrences, being determined in accordance with ASTM D-1238 at 300° C./under 1.2 kg load, said percent both occurrences being relative to the total weight of said (i) and (ii).

9. The composition of claim 8 wherein said polycarbonate is present in an amount of 70 to 90 percent.

10. The composition of claim 8 wherein said copolyester is present in an amount of 10 to 30 percent.

11. The composition of claim 8 wherein said polycarbonate has an index of about 20 to 70 g/10 min.

12. The composition of claim 11 wherein said (i) is a homopolycarbonate derived from bisphenol-A.

13. The composition of claim 1 wherein said polycarbonate resin is prepared from 3,3,5-trimethyl-1,1-bis(4-hydroxyphenyl)-cyclohexane.

14. A thermoplastic molding composition having lowered birefringence values comprising (i) about 60 to 99 percent by weight of a polycarbonate resin, and (ii) about 1 to 40 percent by weight of a copolyester of phthalic acid and a mixture of cyclohexanedimethanol and ethylene glycol, said cyclohexane dimethanol and said ethylene glycol being present in said polyester copolymer in a molar ratio of 1:1 to 4:1 therebetween, said polycarbonate having a melt flow index of at least 18.0 g/10 minutes as determined in accordance with ASTM D-1238 at 300° C./under 1.2 kg load, said percent in both occurrences being relative to the total weight of said (i) and (ii), said lowered birefringence values being in comparison to the values of said polycarbonate resin.

15. The composition of claim 14 wherein said polycarbonate is present in an amount of 70 to 90 percent.

16. The composition of claim 14 wherein said copolyester is present in an amount of 10 to 30 percent.

17. The composition of claim 14 wherein said index is about 50 to 80 g/10 min.

18. The composition of claim 14 wherein said index is about 65 to 75 g/10 min.

19. The composition of claim 14 wherein said (i) is a homopolycarbonate derived from bisphenol-A.

20. The composition of claim 17 wherein said (i) is a homopolycarbonate derived from bisphenol-A.

21. A thermoplastic molding composition having melt flow index of at least 30 g/10 minutes and lowered birefringence values, comprising (i) about 60 to 99 percent by weight of a polycarbonate resin, and (ii) about 1 to 40 percent by weight of a copolyester of phthalic acid and a mixture of cyclohexanedimethanol and ethylene glycol, said cyclohexane dimethanol and said ethylene glycol being present in said polyester copolymer in a molar ratio of 1:1 to 4:1 therebetween, said polycarbonate having a melt flow index of at least 18.0 g/10 minutes; said index, both occurrences, being determined in accordance with ASTM D-1238 at 300° C./under 1.2 kg load, said percent both occurrences being relative to the total weight of said (i) and (ii) said lowered birefringence values being in comparison to the values of said polycarbonate resin.

22. The composition of claim 21 wherein said polycarbonate is present in an amount of 70 to 90 percent.

23. The composition of claim 21 wherein said copolyester is present in an amount of 10 to 30 percent.

24. The composition of claim 21 wherein said polycarbonate has an index of about 20 to 70 g/10 min.

25. The composition of claim 23 wherein said (i) is a homopolycarbonate derived from bisphenol-A.

26. The composition of claim 14 wherein said polycarbonate resin is prepared from 3,3,5-trimethyl-1,1-bis(4-hydroxyphenyl)-cyclohexane.

\* \* \* \* \*